United States Patent
Umemura et al.

(10) Patent No.: US 12,522,198 B2
(45) Date of Patent: Jan. 13, 2026

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Aichi-ken (JP)

(72) Inventors: Yoshihisa Umemura, Nagoya (JP); Suguru Kumazawa, Nisshin (JP); Yasutaka Tsuchida, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 239 days.

(21) Appl. No.: 18/335,133

(22) Filed: Jun. 15, 2023

(65) Prior Publication Data
US 2024/0001907 A1 Jan. 4, 2024

(30) Foreign Application Priority Data
Jun. 29, 2022 (JP) .................................. 2022-104845

(51) Int. Cl.
*G07C 5/00* (2006.01)
*B60W 10/06* (2006.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/15; B60W 10/06; B60W 10/08; B60W 2510/244; B60W 2710/18; B60W 2720/10
See application file for complete search history.

(56) References Cited

U.S. PATENT DOCUMENTS

| | | | | |
|---|---|---|---|---|
| 9,026,290 B2 * | 5/2015 | Kabe | ...................... | B60W 20/40 180/65.265 |
| 2005/0090365 A1 * | 4/2005 | Tamai | ...................... | B60K 6/543 477/37 |

(Continued)

FOREIGN PATENT DOCUMENTS

| | | |
|---|---|---|
| JP | 2009-149161 A | 7/2009 |
| JP | 2017-128152 A | 7/2017 |

*Primary Examiner* — Kito R Robinson
*Assistant Examiner* — Anthony Gabriel Mora
(74) *Attorney, Agent, or Firm* — HAUPTMAN HAM, LLP (57) ABSTRACT

A hybrid electric vehicle includes an engine that includes a filter collecting PM from exhaust gas. A controller for the vehicle executes a driving force switching process, a motoring process, and a setting process. The driving force switching process reduces braking torque, which is generated by a drive system during deceleration of the vehicle, so that when execution of a fuel cut-off process of the engine is prohibited, the braking torque is less than when execution of the fuel cut-off process is permitted. The motoring process burns and removes PM from the filter by rotationally driving the engine using a first rotary electric machine during deceleration of the vehicle. The setting process sets a vehicle speed for permitting execution of the motoring process to be higher when execution of the fuel cut-off process is prohibited than when execution of the fuel cut-off process is permitted.

13 Claims, 4 Drawing Sheets

(51) Int. Cl.
    *B60W 10/08*   (2006.01)
    *B60W 20/15*   (2016.01)
    *G07C 5/02*    (2006.01)
    *G07C 5/04*    (2006.01)
    *G07C 5/08*    (2006.01)

(52) U.S. Cl.
    CPC ... *B60W 2510/244* (2013.01); *B60W 2710/18* (2013.01); *B60W 2720/10* (2013.01)

(56) References Cited

U.S. PATENT DOCUMENTS

| | | | |
|---|---|---|---|
| 2009/0150035 A1* | 6/2009 | Soliman | B60W 20/30 180/65.7 |
| 2013/0253750 A1* | 9/2013 | Otake | B60W 10/08 701/123 |
| 2016/0129903 A1* | 5/2016 | Takahashi | B60W 10/08 903/910 |
| 2017/0015323 A1* | 1/2017 | Oguri | B60W 10/08 |
| 2017/0036662 A1* | 2/2017 | Chen | B60W 10/06 |
| 2017/0066433 A1* | 3/2017 | Muta | B60W 20/14 |
| 2018/0015916 A1* | 1/2018 | Banshoya | F16H 61/0025 |
| 2018/0216552 A1* | 8/2018 | Yokoi | F01N 3/0842 |
| 2018/0354499 A1* | 12/2018 | Park | B60W 10/10 |
| 2020/0223426 A1* | 7/2020 | Hara | F02D 41/0245 |
| 2020/0240343 A1* | 7/2020 | Iwasaki | B60W 10/026 |
| 2020/0377072 A1* | 12/2020 | Kim | B60K 6/485 |
| 2021/0039626 A1* | 2/2021 | Matsubara | B60W 10/08 |
| 2021/0129826 A1* | 5/2021 | Furuya | B60W 30/194 |
| 2021/0300323 A1* | 9/2021 | Iizawa | B60K 6/445 |

* cited by examiner

CONTROLLER FOR HYBRID ELECTRIC VEHICLE AND METHOD FOR CONTROLLING HYBRID ELECTRIC VEHICLE

RELATED APPLICATIONS

The present application claims priority of Japanese Application Number 2022-104845 filed on Jun. 29, 2022, the disclosure of which is hereby incorporated by reference herein in its entirety.

BACKGROUND

1. Field

The following description relates to a controller for a hybrid electric vehicle and a method for controlling a hybrid electric vehicle.

2. Description of Related Art

A hybrid electric vehicle may include an engine that includes a filter for collecting particulate matter from exhaust gas. When a great amount of particulate matter is deposited on the filter and the engine undergoes fuel cut-off, the deposited particulate matter may be burned at once. As a result, the filter may be overheated. In this regard, Japanese Laid-Open Patent Publication No. 2017-128152 discloses prohibition of the fuel cut-off of the engine when the amount of particulate matter deposited on the filter exceeds a certain amount.

However, prohibition of the fuel cut-off decreases a braking torque generated by the engine during deceleration, which is referred to as engine braking. As a result, the deceleration rate of the vehicle may be decreased, and an occupant may perceive awkwardness. The decrease in the deceleration rate of the vehicle caused by a decrease in the engine braking may be compensated for by increasing the amount of regenerative braking. However, the increase in the amount of regenerative braking may unbalance the charging and discharging and overcharge the battery. In this regard, the patent document described above discloses a controller that executes a driving force switching process that decelerates a hybrid electric vehicle at a lower rate when execution of the fuel cut-off is prohibited than when the execution of the fuel cut-off is permitted.

During deceleration of the vehicle, motoring, which generates rotation from the engine using a motor, may be executed to execute a regeneration process of the filter. When the deceleration rate of the vehicle is decreased by the driving force switching process, the amount of power generated by a regenerative operation is decreased. Consequently, when the deceleration rate is decreased and the filter regeneration process is executed, the amount of power consumed by the motoring may greatly exceed the amount of power generated by a regenerative operation. This may result in the overdischarging of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a controller for a hybrid electric vehicle. The hybrid electric vehicle includes a drive system including an engine, a first rotary electric machine, and a second rotary electric machine. The engine includes a filter configured to collect particulate matter from an exhaust gas. The first rotary electric machine is configured to generate rotational force applied to the engine in accordance with supply of electric power from a battery. The second rotary electric machine is configured to receive rotational force transmitted from a wheel and generate electric power. The controller includes processing circuitry configured to execute a fuel cut-off process that performs a fuel cut-off of the engine to generate engine braking during deceleration of the hybrid electric vehicle, a driving force switching process that reduces a braking torque generated by the drive system during deceleration of the hybrid electric vehicle so that when execution of the fuel cut-off process is prohibited, the braking torque is less than when execution of the fuel cut-off process is permitted, a motoring process that rotationally drives the engine using the first rotary electric machine to burn and remove the particulate matter collected on the filter during deceleration of the hybrid electric vehicle, and a setting process that sets a vehicle speed at which execution of the motoring process is permitted to be higher when execution of the fuel cut-off process is prohibited than when execution of the fuel cut-off process is permitted.

An aspect of the present disclosure is a method for controlling a hybrid electric vehicle. The hybrid electric vehicle includes a drive system including an engine, a first rotary electric machine, and a second rotary electric machine. The engine includes a filter configured to collect particulate matter from an exhaust gas. The first rotary electric machine is configured to generate rotational force applied to the engine in accordance with supply of electric power from a battery. The second rotary electric machine is configured to receive rotational force transmitted from a wheel and generate electric power. The method includes reducing a braking torque generated by the drive system during deceleration of the hybrid electric vehicle based on prohibition of execution of a fuel cut-off process, maintaining a state in which the braking torque generated by the drive system during deceleration of the hybrid electric vehicle is reduced until the prohibition of execution of the fuel cut-off process is canceled or until a trip ends, executing a motoring process that drives the engine using the first rotary electric machine in a state where combustion of the engine is stopped under a condition in which a deposition amount of the particulate matter is greater than or equal to a predetermined determination value, the hybrid electric vehicle is decelerating, and a vehicle speed of the hybrid electric vehicle is greater than or equal to a motoring permission vehicle speed, and terminating the motoring process when the vehicle speed of the hybrid electric vehicle is less than the motoring permission vehicle speed. The reducing a braking torque generated by the drive system during deceleration of the hybrid electric vehicle based on prohibition of execution of a fuel cut-off process is executed together with increasing the motoring permission vehicle speed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a controller for a hybrid electric vehicle will be described below in detail with reference to FIGS. 1 to 6.

Drive System of Hybrid Electric Vehicle

The structure of the drive system of the hybrid electric vehicle that uses the controller of the present embodiment will be described with reference to FIG. 1. The drive system of the hybrid electric vehicle includes an engine 10, a first rotary electric machine 71, and a second rotary electric machine 72. The engine 10 is an internal combustion engine that burns fuel to generate driving force. The first rotary electric machine 71 and the second rotary electric machine 72 act as an electric motor, which is supplied with electric power to generate driving force, and as a generator, which receives driving force from the outside to generate electric power.

Figure 1:
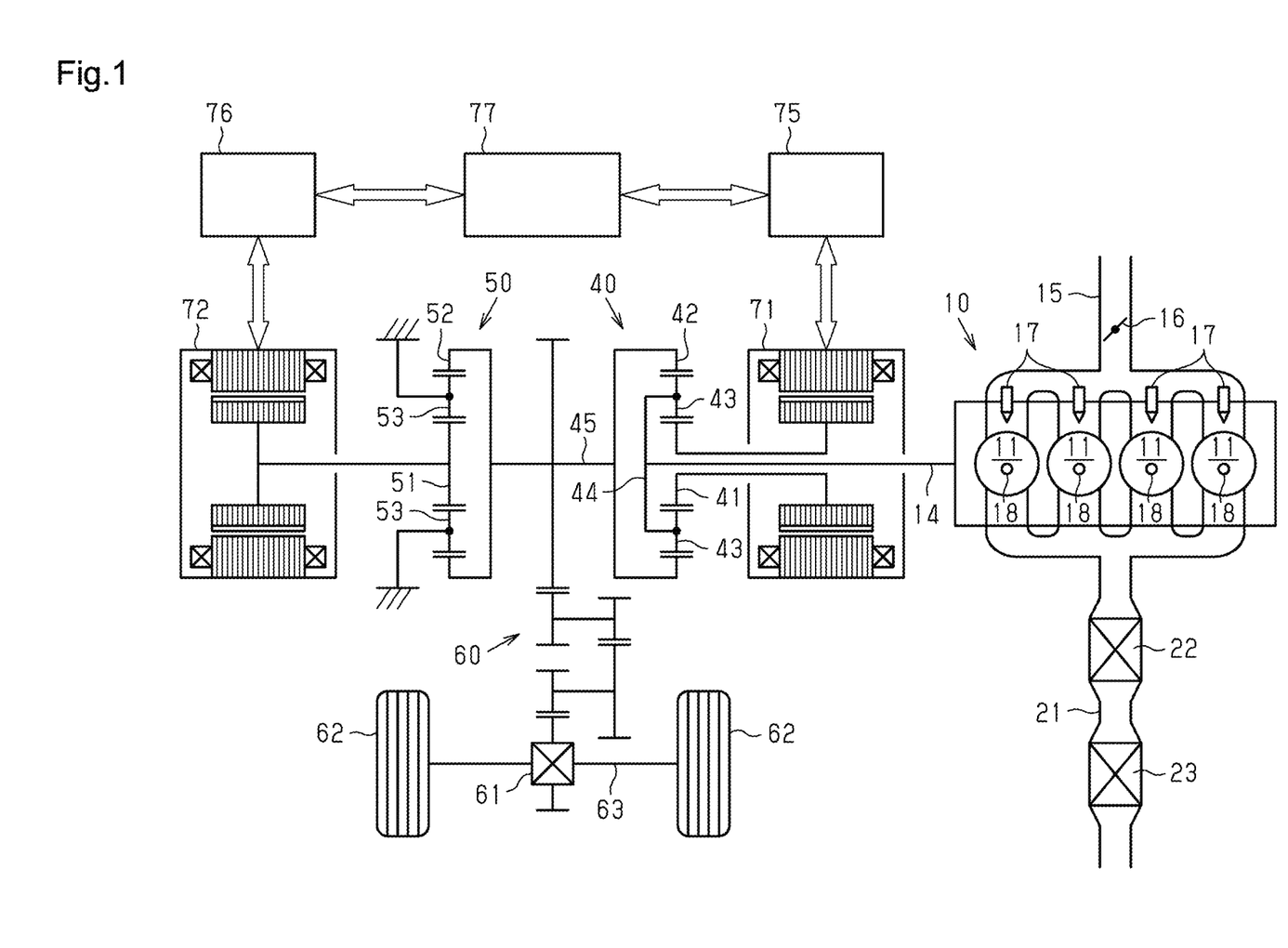
FIG. 1 is a schematic diagram showing the structure of a drive system of a hybrid electric vehicle that uses an embodiment of a controller.

The hybrid electric vehicle shown in FIG. 1 further includes a battery 77, a first inverter 75, and a second inverter 76. The first inverter 75 converts a direct current discharged from the battery 77 into an alternating current and supplies the alternating current to the first rotary electric machine 71. The first inverter 75 also converts an alternating current generated by the first rotary electric machine 71 into a direct current and charges the battery 77 with the direct current. The second inverter 76 converts a direct current discharged by the battery 77 into an alternating current, and supplies the alternating current to the second rotary electric machine 72. The second inverter 76 also converts an alternating current generated by the second rotary electric machine 72 into a direct current and charges the battery 77 with the direct current.

The engine 10 includes cylinders 11 in which an air-fuel mixture is burned. The engine 10 further includes an intake passage 15 used as a passage through which air is drawn into each cylinder 11. The intake passage 15 includes a throttle valve 16 that regulates the flow rate of the intake air. The intake passage 15 includes a portion located downstream of the throttle valve 16 and branching to each cylinder. The portions of the intake passage 15 branched for each cylinder include injectors 17, respectively. Each cylinder 11 includes an ignition device 18 performing spark discharge to ignite the air-fuel mixture drawn into the cylinder 11. The engine 10 further includes an exhaust passage 21 used as a discharge passage for exhaust gas produced by combustion of the air-fuel mixture in each cylinder 11. A three-way catalyst device 22 configured to purify the exhaust gas is disposed in the exhaust passage 21. The exhaust passage 21 further includes a filter 23 disposed at a downstream side of the three-way catalyst device 22 to collect particulate matter (PM) from the exhaust gas.

With the configuration described above, an air-fuel mixture including fuel injected by the injectors 17 is drawn into the cylinders 11 of the engine 10 through the intake passage 15. When the ignition devices 18 ignite the air-fuel mixture, combustion is performed in the cylinders 11. Exhaust gas produced by the combustion is discharged from the cylinders 11 to the exhaust passage 21. In the engine 10, the three-way catalyst device 22 oxidizes HC and CO and reduces NOx contained in the exhaust gas, and the filter 23 collects PM from the exhaust gas. This purifies the exhaust gas.

The hybrid electric vehicle includes a first planetary gear mechanism 40. The first planetary gear mechanism 40 includes a sun gear 41, which is an external gear, and a ring gear 42, which is an internal gear disposed coaxially with the sun gear 41. Pinion gears 43 are disposed between the sun gear 41 and the ring gear 42 to engage with both the sun gear 41 and the ring gear 42. The pinion gears 43 are supported by a carrier 44 to be allowed to rotate and orbit. The sun gear 41, the ring gear 42, and the carrier 44 are three rotary elements of the first planetary gear mechanism 40. The carrier 44 of the first planetary gear mechanism 40 is coupled to a crankshaft 14, which is an output shaft of the engine 10. The sun gear 41 is coupled to the first rotary electric machine 71. The ring gear 42 is connected to a drive shaft 45. The drive shaft 45 is connected to wheels 62 by a speed reduction mechanism 60, a differential mechanism 61, and a wheel axle 63. That is, the drive shaft 45 is a shaft that transmits driving force to the wheels 62.

The second rotary electric machine 72 is coupled to the drive shaft 45 by a second planetary gear mechanism 50. The second planetary gear mechanism 50 includes a sun gear 51, which is an external gear, and a ring gear 52, which is an internal gear disposed coaxially with the sun gear 51. Pinion gears 53 are disposed between the sun gear 51 and the ring gear 52 to engage with both the sun gear 51 and the ring gear 52. Each pinion gear 53 is allowed to rotate but is not allowed to orbit. The ring gear 52 of the second planetary gear mechanism 50 is connected to the drive shaft 45. The sun gear 51 of the second planetary gear mechanism 50 is connected to the second rotary electric machine 72. The second planetary gear mechanism 50 acts as a speed reduction mechanism that reduces the speed of rotation of the second rotary electric machine 72 and transmits the rotation to the drive shaft 45.

Configuration of Controller

Figure 2:
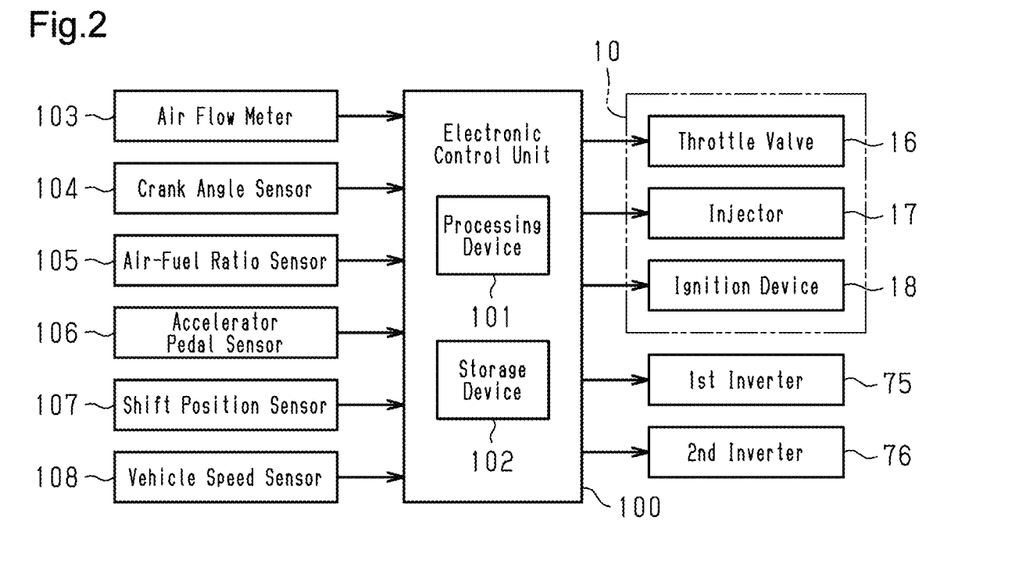
FIG. 2 is a schematic diagram showing the configuration of the controller.

The configuration of the controller for the hybrid electric vehicle according to the present embodiment will be described with reference to FIG. 2.

As the controller, an electronic control unit 100 is mounted on the hybrid electric vehicle. The electronic control unit 100 includes a processing device 101 that executes various processes for controlling the vehicle and a storage device 102 that stores programs and data for controlling the vehicle. In practice, the electronic control unit 100 includes two or more control units such as a unit for controlling the engine and a unit for controlling the battery.

The hybrid electric vehicle includes sensors such as an air flow meter 103, a crank angle sensor 104, an air-fuel ratio sensor 105, an accelerator pedal sensor 106, a shift position sensor 107, and a vehicle speed sensor 108. The air flow meter 103 is a sensor that detects an intake air amount GA of the engine 10. The crank angle sensor 104 detects the rotational phase of the crankshaft 14. The air-fuel ratio sensor 105 detects the air-fuel ratio of the air-fuel mixture burned in the cylinder 11. The accelerator pedal sensor 106 detects an accelerator pedal operation amount ACC, which is the amount of the accelerator pedal operated by the driver. The shift position sensor 107 detects the position of the shift lever operated by the driver. The vehicle speed sensor 108 detects a vehicle speed V of the hybrid electric vehicle.

Detection signals of the sensors are input to the electronic control unit 100. The electronic control unit 100 executes various controls of the hybrid electric vehicle based on the detection results of the sensors. In an example, the electronic control unit 100 controls the operation of the engine 10 by controlling the throttle valves 16, the injectors 17, the ignition devices 18, and the like. The electronic control unit 100 also controls the torques of the first rotary electric machine 71 and the second rotary electric machine 72 by controlling the first inverter 75 and the second inverter 76.

Traveling Control of Hybrid Electric Vehicle

The electronic control unit 100 configured as described above controls the traveling of the hybrid electric vehicle based on detection signals and information that are input. In the traveling control, the electronic control unit 100 sets the value of a target drive torque T* based on the accelerator pedal operation amount ACC, the vehicle speed V, and the like. The target drive torque T* represents a target value of the torque of the drive shaft 45 generated by the drive system. The electronic control unit 100 controls the torques of the engine 10, the first rotary electric machine 71, and the second rotary electric machine 72 so that the drive system generates torque of the drive shaft 45 that is equal to the target drive torque T*. At this time, the electronic control unit 100 determines the distribution of the torque generated by each of the engine 10, the first rotary electric machine 71, and the second rotary electric machine 72 based on the efficiency of the engine 10 and the charge state of the battery 77.

Fuel Cut-Off Process

The electronic control unit 100 may set the value of the target drive torque T* to a negative value, for example, during deceleration of the hybrid electric vehicle. The phrase "during deceleration of the hybrid electric vehicle" refers to when the hybrid electric vehicle is traveling with the accelerator pedal released. At this time, the electronic control unit 100 controls the torques of the engine 10, the first rotary electric machine 71, and the second rotary electric machine 72 so that the drive system generates braking torque on the drive shaft 45. If the braking torque is generated by only the regenerative braking of the second rotary electric machine 72, the battery 77 may be overcharged. In such a case, the electronic control unit 100 executes the fuel cut-off process, which stops the injectors 17 from injecting the fuel, so that the engine braking is generated. That is, at this time, the engine 10 produces rotation along the rotational force transmitted from the drive shaft 45. The engine 10 generates braking torque, which reduces the rotation of the drive shaft 45, due to friction loss and pumping loss.

As described above, the engine 10 includes the filter 23, which collects PM from the exhaust gas. When the fuel cut-off is executed, the gas in the exhaust passage 21 is replaced with fresh air. Thus, a great amount of oxygen flows into the filter 23. The oxygen burns the PM collected on the filter 23. Hence, if a great amount of PM is collected and the fuel cut-off is executed, the burning of PM produces heat and may increase the temperature of the filter 23 beyond the allowable upper limit.

The electronic control unit 100 estimates the amount of PM deposited on the filter 23 based on a running state of the engine 10. When the PM deposition amount is greater than or equal to a predetermined threshold value, the electronic control unit 100 prohibits execution of the fuel cut-off process. The electronic control unit 100 sets a FC prohibition flag to indicate that the fuel cut-off process is prohibited.

Driving Force Switching Process

As described above, the electronic control unit 100 sets the value of the target drive torque T* to a negative value, for example, during deceleration so that the drive system generates braking torque. When execution of the fuel cut-off process is prohibited, the engine braking is reduced. The reduced engine braking needs to be compensated for by regenerative braking of the second rotary electric machine 72. However, if the second rotary electric machine 72 generates an excessive amount of regenerative power, the battery 77 may be overcharged. Therefore, when execution of the fuel cut-off process is prohibited, the electronic control unit 100 executes the driving force switching process that reduces the braking torque generated by the drive system during deceleration of the hybrid electric vehicle. Once the braking torque during deceleration is reduced in the driving force switching process, the electronic control unit 100 maintains the state until the trip ends. A trip refers to a period from when the ignition switch is pressed to activate the controller to when the ignition switch is pressed to deactivate the controller. More specifically, in the driving force switching process, when execution of the fuel cut-off process is prohibited, the braking torque remains reduced until the trip ends even when execution of the fuel cut-off process is permitted thereafter. In the following description, the "driving force switching time" refers to a state in which the braking torque during deceleration is reduced by the driving force switching process. The "normal time" refers to a state in which the braking torque is not reduced.

Figure 3:
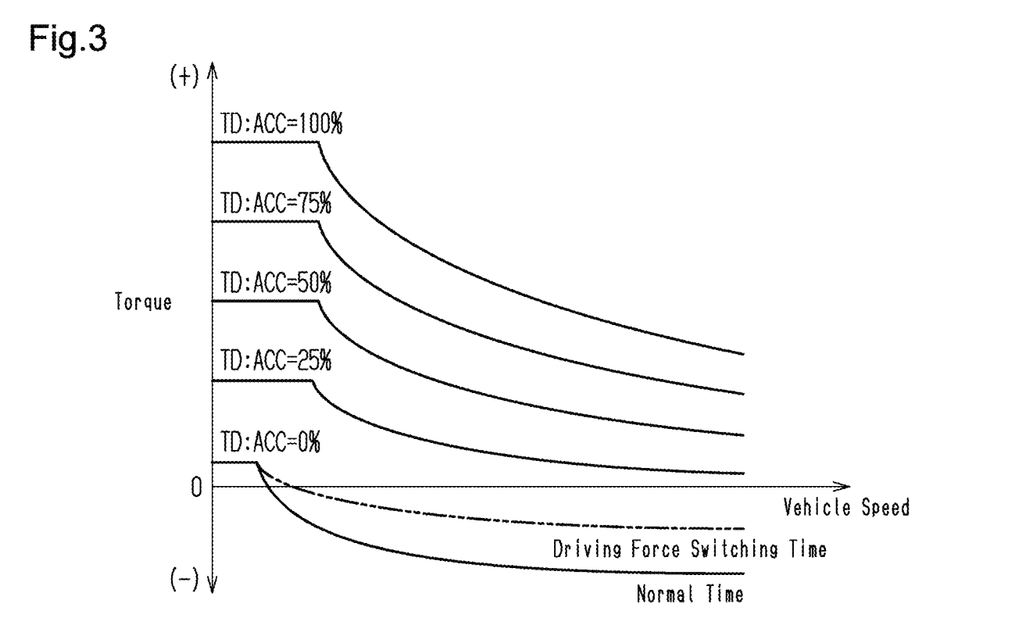
FIG. 3 is a graph showing setting modes of a target driving torque of the controller.

FIG. 3 shows setting modes of a target braking torque TD set by the electronic control unit 100. FIG. 3 shows the relationship between the vehicle speed and the target braking torque TD when the accelerator pedal operation amount ACC is 25%, 50%, 75%, and 100%. FIG. 3 also shows the relationship between the vehicle speed and the target braking torque TD with 0% of the accelerator pedal operation amount ACC when the fuel cut-off process is prohibited and when permitted. As shown in the figure, when the accelerator pedal operation amount ACC is greater than or equal to 25%, the value of the target braking torque TD is constantly set to a positive value. When the accelerator pedal operation amount ACC is 0%, that is, during deceleration of the hybrid electric vehicle, the value of the target braking torque TD is set to a negative value when the vehicle speed exceeds a certain speed. When the accelerator pedal operation amount ACC is 0%, the value of the target braking torque TD is set to be greater in the driving force switching time than in the normal time.

Filter Regeneration

The filter 23 installed in the engine 10 may be clogged by collected PM. When the amount of PM deposited on the filter 23 exceeds a certain amount, the electronic control unit 100 performs filter regeneration for removing the deposited PM. In the filter regeneration, the electronic control unit 100 executes a motoring process that produces rotation from the engine 10 using the first rotary electric machine 71 in a state in which combustion of the engine 10 is stopped during deceleration of the hybrid electric vehicle. When the motoring process is executed, the exhaust gas flowing through the exhaust passage 21 is replaced with fresh air, and oxygen is supplied to the filter 23. The supplied oxygen burns and removes the PM deposited on the filter 23.

During execution of the fuel cut-off process, oxygen is supplied to the filter 23 and burns PM. However, it is difficult to control the period for executing the fuel cut-off process and the amount of oxygen supplied to the filter 23 during the fuel cut-off process. Hence, when a great amount of PM is deposited, it is desirable that execution of the fuel cut-off process be prohibited to reliably avoid the overheating of the filter 23. In contrast, in the motoring process, in which the first rotary electric machine 71 produces rotation from the engine 10, the execution period and the amount of oxygen supplied to the filter 23 during the execution are controlled more easily than in the fuel cut-off process. Therefore, when a large amount of PM is deposited and the filter 23 is prone to overheating during the filter regeneration, it is desirable that the filter 23 is regenerated by the motoring process while execution of the fuel cut-off process is prohibited.

Figure 4:
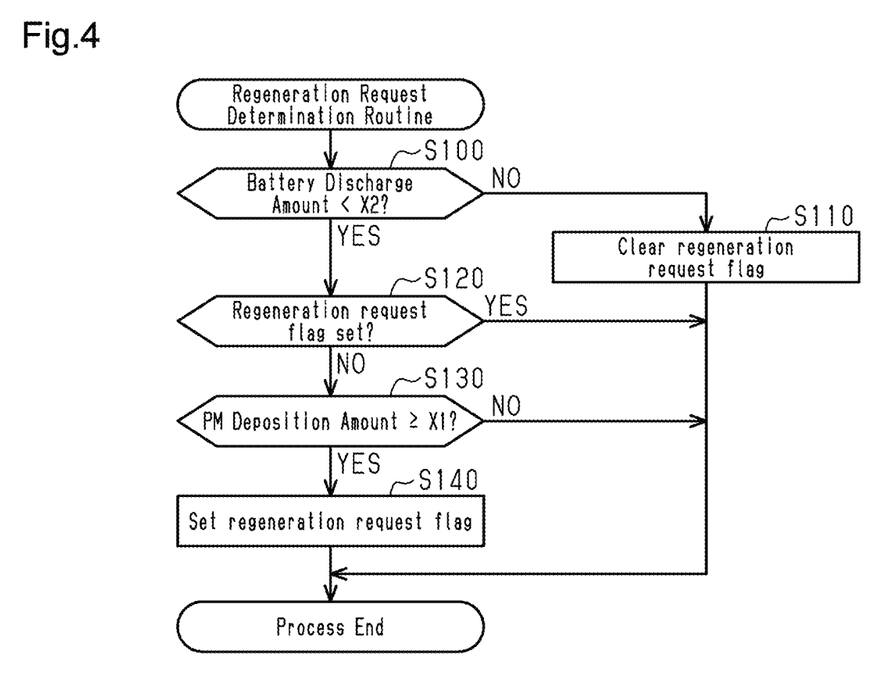
FIG. 4 is a flowchart of a regeneration request determination routine executed by the controller.

FIG. 4 is a flowchart of a regeneration request determination routine for determining whether or not to perform the filter regeneration. The electronic control unit 100 repeatedly executes the routine in a predetermined control cycle while the hybrid electric vehicle is traveling.

When the process of the routine starts, in step S100, the electronic control unit 100 determines whether a discharge amount of the battery 77 is less than a predetermined determination value X2. More specifically, in step S100, the electronic control unit 100 determines whether the balance of the charging and discharging of the battery 77 in a predetermined period up to the present time is biased toward the discharging. When the discharge amount of the battery 77 is greater than or equal to the determination value X2 (NO), the electronic control unit 100 proceeds to step S110 and clears the regeneration request flag. Then, the electronic control unit 100 ends the process of the routine in the present control cycle. When the regeneration request flag is set, it indicates that the filter regeneration is requested to be performed.

When the discharge amount of the battery 77 is less than the determination value X2 (S100: YES), the electronic control unit 100 proceeds to step S120. In step S120, the electronic control unit 100 determines whether the regeneration request flag is set. When the regeneration request flag is set (YES), the electronic control unit 100 ends the process of the routine in the present control cycle. When the regeneration request flag is not set (NO), the electronic control unit 100 proceeds to step S130.

In step S130, the electronic control unit 100 determines whether the amount of PM deposited on the filter 23 is greater than or equal to a predetermined determination value X1. The electronic control unit 100 estimates the PM deposition amount based on the running state of the engine 10. The determination value X1 is set to a value that is less than an amount of PM deposited on the filter 23 that clogs the filter 23. When the PM deposition amount is less than the determination value X1 (NO), the electronic control unit 100 ends the process of the routine in the present control cycle. When the PM deposition amount is greater than or equal to the determination value X1 (YES), the electronic control unit 100 proceeds to step S140. In step S140, the electronic control unit 100 sets the regeneration request flag and then ends the process of the routine in the present control cycle.

Figure 5:
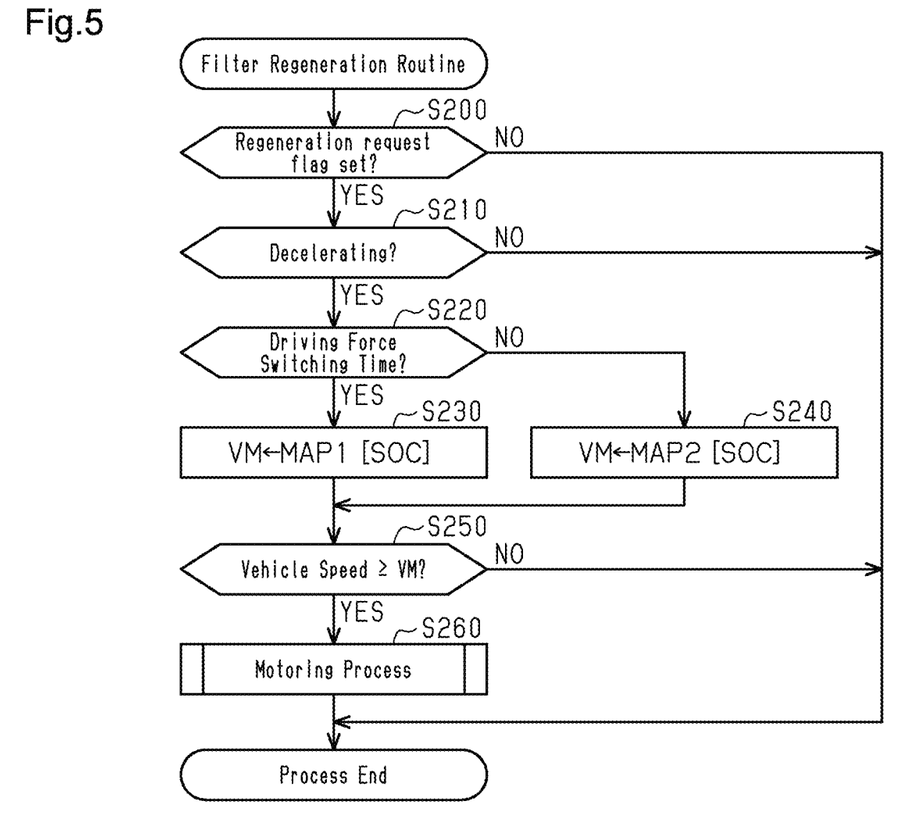
FIG. 5 is a flowchart of a motoring process routine executed by the controller.

FIG. 5 shows a flowchart of a filter regeneration routine executed by the electronic control unit 100 to perform the filter regeneration. This routine is also repeatedly executed by the electronic control unit 100 in a predetermined control cycle while the hybrid electric vehicle is traveling.

When the routine starts, in step S200, the electronic control unit 100 determines whether the regeneration request flag is set. When the regeneration request flag is set (YES), the electronic control unit 100 proceeds to step S210. When the regeneration request flag is not set (NO), the electronic control unit 100 ends the process of the routine in the present control cycle.

In step S210, the electronic control unit 100 determines whether the hybrid electric vehicle is decelerating. In an example, the electronic control unit 100 determines that the hybrid electric vehicle is decelerating when the accelerator pedal operation amount ACC is zero and the vehicle speed is greater than or equal to a certain speed. When the hybrid electric vehicle is decelerating (YES), the electronic control unit 100 proceeds to step S220. When the hybrid electric vehicle is not decelerating (NO), the electronic control unit 100 ends the process of the routine in the present control cycle.

In step S220, the electronic control unit 100 determines whether it is the driving force switching time. More specifically, in step S220, the electronic control unit 100 determines whether the braking torque generated by the drive system during deceleration is reduced by the drive force switching process. When it is the driving force switching time, the electronic control unit 100 proceeds to step S230. When it is the normal time, the electronic control unit 100 proceeds to step S240.

In step S230, the electronic control unit 100 calculates a motoring permission vehicle speed VM based on a battery SOC using a first calculation map MAP1 stored in advance in the storage device 102. The battery SOC represents the state of charge of the battery 77. In step S240, the electronic control unit 100 calculates the motoring permission vehicle speed VM based on the battery SOC using a second calculation map MAP2 stored in advance in the storage device 102. That is, the electronic control unit 100 calculates the motoring permission vehicle speed VM using different calculation maps for the driving force switching time and the normal time.

Figure 6:
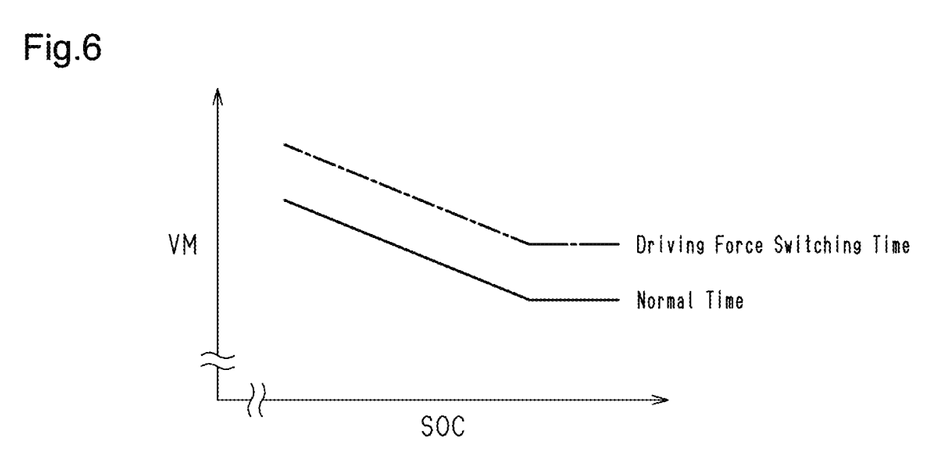
FIG. 6 is a graph showing setting modes of a motoring permission vehicle speed of the controller.

FIG. 6 shows the relationship between the battery SOC and the motoring permission vehicle speed VM in the first calculation map MAP1 and the second calculation map MAP2. In each of the calculation maps, the motoring permission vehicle speed VM is set to a higher vehicle speed when the battery SOC is relatively low than when the battery SOC is relatively high. When the battery SOCs have the same value, the motoring permission vehicle speed VM is set to a higher vehicle speed in the first calculation map MAP1, used in the driving force switching time, than in the second calculation map MAP2, used in the normal time.

Subsequent to the calculation of the motoring permission vehicle speed VM executed in step S230 or S240, the electronic control unit 100 proceeds to step S250. In step S250, the electronic control unit 100 determines whether the vehicle speed is greater than or equal to the motoring permission vehicle speed VM. When the vehicle speed is less than the motoring permission vehicle speed VM (NO), the electronic control unit 100 ends the process of the routine in the current control cycle. When the vehicle speed is greater than or equal to the motoring permission vehicle speed VM (YES), the electronic control unit 100 proceeds to step S260.

In step S260, the electronic control unit 100 starts the motoring process. The electronic control unit 100 ends the motoring process when any one of the following first to third cases occurs. The first case is when the regeneration of the filter 23 is completed. The second case is when the hybrid electric vehicle has stopped or re-accelerated, and thus is no longer decelerating. The third case is when the temperature of the filter 23 is greater than or equal to a certain temperature. The electronic control unit 100 clears the regeneration request flag in the first case, that is, when the regeneration of the filter 23 is completed.

The electronic control unit 100 determines the completion of the regeneration of the filter 23, for example, in the following manner. In the determination, the electronic control unit 100 calculates an amount of time in which the motoring process needs to be executed to burn deposited PM corresponding to the PM deposition amount at the time of starting the motoring process. The electronic control unit 100 determines that the regeneration of the filter 23 is completed when the amount of time calculated has elapsed from the time of starting the motoring process.

Operation and Advantages of Embodiment

The operation and advantages of the present embodiment will now be described.

The electronic control unit 100 sets the regeneration request flag when the discharge amount of the battery 77 is less than the determination value X2 and the PM deposition amount is greater than or equal to the regeneration request determination value X1. When the regeneration request flag is set, the electronic control unit 100 permits execution of the motoring process if the hybrid electric vehicle is decelerating and the vehicle speed is greater than or equal to the motoring permission vehicle speed VM. The electronic control unit 100 sets the motoring permission vehicle speed VM to a vehicle speed that is increased as the battery SOC becomes lower.

In the motoring process, the engine 10 is rotationally driven by the first rotary electric machine 71. Therefore, during the motoring process, electric power is consumed for a driving operation of the first rotary electric machine 71. The motoring process is executed during deceleration of the hybrid electric vehicle. During deceleration of the hybrid electric vehicle, the second rotary electric machine 72 is generating braking torque by regenerative power generation. If the amount of electric power consumed by the first rotary electric machine 71 during the motoring process greatly exceeds the amount of regenerative power generated by the second rotary electric machine 72, the electric power stored in the battery 77 may be used and the battery 77 may be overdischarged. The amount of electric power dischargeable from the battery 77 before the battery 77 becomes overdischarged is greater when the battery SOC is relatively high than when the battery SOC is relatively low.

The electronic control unit 100 permits execution of the motoring process on the condition that the vehicle speed is greater than or equal to the motoring permission vehicle speed VM. The electronic control unit 100 sets the motoring permission vehicle speed VM to a higher vehicle speed when the battery SOC is relatively low than when the battery SOC is relatively high. That is, the electronic control unit 100 executes the motoring process in a higher vehicle speed range when the battery SOC is relatively low than when the battery SOC is relatively high. The amount of regenerative power generated by the second rotary electric machine 72 during deceleration increases as the vehicle speed becomes higher. Thus, the motoring process can be executed so that the over-charging of the battery 77 is avoided.

The electronic control unit 100 prohibits execution of the fuel cut-off process when the amount of PM deposited on the filter 23 is greater than or equal to the predetermined threshold value. When execution of the fuel cut-off process is prohibited in the driving force switching process, the electronic control unit 100 reduces the braking torque generated by the drive system during deceleration of the hybrid electric vehicle until the trip ends. Since the engine 10 cannot generate braking torque in the motoring process, braking torque of the drive system is generated by regenerative power generated by the second rotary electric machine 72.

When the braking torque generated by the drive system during deceleration is reduced by the driving force switching process, the amount of regenerative power generated by the second rotary electric machine 72 is decreased during the motoring process. In this regard, the electronic control unit 100 sets the motoring permission vehicle speed VM to a higher vehicle speed in the driving force switching time than in the normal time. Thus, in the driving force switching time, the vehicle speed range in which the motoring process is executed is higher than in the normal time.

The controller for the hybrid electric vehicle of the present embodiment has the following advantages.

(1) When the fuel cut-off process is executed, oxygen is supplied to the filter 23 and burns the deposited PM. When a great amount of PM is deposited and the fuel cut-off process is executed, the amount of PM burned in the filter 23 increases. As a result, the filter 23 may be overheated by heat generated by the burning. In this regard, the electronic control unit 100 of the present embodiment prohibits execution of the fuel cut-off process when the amount of PM deposited on the filter 23 is greater than or equal to the predetermined threshold value. Thus, the filter 23 is less likely to be overheated.

(2) When the fuel cut-off process is prohibited, the engine braking is reduced during deceleration of the hybrid electric vehicle. If the drive system of the hybrid electric vehicle is configured to generate the same braking torque when the fuel cut-off process is prohibited and when the fuel cut-off process is permitted, the amount of regenerative power generated by the second rotary electric machine 72 may increase and the battery 77 may be overcharged. In this regard, when the fuel cut-off process is prohibited, the electronic control unit 100 of the present embodiment executes the driving force switching process that reduces the braking torque generated by the drive system of the hybrid electric vehicle. Thus, the battery 77 is less likely to be overcharged by regenerative power generated by the second rotary electric machine 72 during deceleration of the hybrid electric vehicle.

(3) While the hybrid electric vehicle is traveling, prohibition and permission of execution of the fuel cut-off process may be switched a number of times. If the driving force switching process changes a deceleration feel of the hybrid electric vehicle in each time of the switching, drivability may deteriorate. In this regard, the electronic control unit 100 maintains the braking torque that has been decreased by the driving force switching process until the trip ends. This reduces the frequency of changes in the deceleration feel while the vehicle is traveling, thereby limiting deterioration in drivability.

(4) The electronic control unit 100 permits execution of the motoring process when the vehicle speed is greater than or equal to the motoring permission vehicle speed VM during deceleration of the hybrid electric vehicle. The electronic control unit 100 sets the motoring permission vehicle speed VM to a higher vehicle speed in the driving force switching time than in the normal time. Thus, even when the amount of regenerative power generated by the second rotary electric machine 72 is decreased due to decreases in the braking torque caused by the driving force switching process, the overdischarging of the battery 77 resulting from power consumption by the motoring process is less likely to occur.

(5) The electric power stored in the battery 77, which is supplied to the drive system of the hybrid electric vehicle, is also supplied to other portions. When such portions consume relatively a large amount of electric power and the motoring process is executed, the battery 77 may be excessively discharged and over-discharged. In this regard, when the discharge amount of the battery 77 is greater than or equal to the determination value X2, the electronic control unit 100 of the present embodiment clears the regeneration request flag. In other words, when the discharge amount of the battery 77 is greater than or equal to the determination value X2, the electronic control unit 100 prohibits execution of the motoring process. Thus, the over-discharging of the battery 77 is less likely to occur.

Other Embodiments

The embodiments described above may be modified as follows. The embodiments and the following modified examples can be combined within a range where the combined modified examples remain technically consistent with each other.

In the embodiment, when the PM deposition amount is greater than or equal to the predetermined threshold value, execution of the fuel cut-off process is prohibited. Instead, the fuel cut-off process may be prohibited under other conditions. In an example, when deterioration of the three-way catalyst device 22 has progressed, if the fuel cut-off process is executed, the deterioration of the three-way catalyst device 22 may be accelerated. Hence, execution of the fuel cut-off process may be prohibited when the degree of deterioration of the three-way catalyst device 22 exceeds a threshold value.

In the embodiment, when the discharge amount of the battery 77 is greater than or equal to the determination value X2, execution of the motoring process is prohibited. Instead, execution of the motoring process may be permitted irrespective of the discharge amount of the battery 77.

In the driving force switching process of the embodiment, once the fuel cut-off process is prohibited, the braking torque remains reduced until the trip ends. Alternatively, when the braking torque is reduced and then execution of the fuel cut-off process is permitted again, the reduction of the braking torque may be canceled. In other words, the driving force switching process may be executed to reduce the braking torque only during the period in which execution of the fuel cut-off process is prohibited.

The vehicle controlling of the embodiment may be applied to a hybrid electric vehicle including a drive system having a configuration different from that shown in FIG. 1.

The controller is not limited to one including a CPU and a ROM and executing software processes. For example, at least part of the processes executed by the software in the embodiment may be executed by a dedicated hardware circuit executing hardware processes (such as ASIC). More specifically, the controller may have any of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. Any number of software execution devices, each including a processor and a program storage device, may be provided. Also, any number of dedicated hardware circuits may be provided. That is, the above-described processes may be executed by processing circuitry that includes one or more software execution devices and/or one or more dedicated hardware circuits. The program storage device, that is, a computer readable medium, includes any medium that can be accessed from a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle, the hybrid electric vehicle including a drive system including an engine, a first rotary electric machine, and a second rotary electric machine, the engine including a filter configured to collect particulate matter from an exhaust gas, the first rotary electric machine being configured to generate rotational force applied to the engine in accordance with supply of electric power from a battery, and the second rotary electric machine being configured to receive rotational force transmitted from a wheel and generate electric power, the controller comprising:

processing circuitry configured to execute;
a fuel cut-off process that performs a fuel cut-off of the engine to generate engine braking during deceleration of the hybrid electric vehicle,
a drive force switching process that reduces a braking torque generated by the drive system during deceleration of the hybrid electric vehicle so that when execution of the fuel cut-off process is prohibited, the braking torque is less than when execution of the fuel cut-off process is permitted, a motoring process that rotationally drives the engine using the first rotary electric machine to burn and remove the particulate matter collected on the filter during deceleration of the hybrid electric vehicle, and a setting process that sets a vehicle speed at which execution of the motoring process is permitted to be higher when execution of the fuel cut-off process is prohibited than when execution of the fuel cut-off process is permitted; and a storage device storing:

a first relationship between a state of charge of the battery and a motoring permission vehicle speed in a state that the braking torque being reduced by the drive force switching process; and a second relationship between the state of charge of the battery and the motoring permission vehicle speed in a state that the braking torque being not reduced by the drive force switching process, wherein for a same value of the state of charge of the battery, the motoring permission vehicle speed is set to a higher motoring permission vehicle speed in the first relationship than in the second relationship, and the processing circuitry is configured to execute:

in response to determining the braking torque being reduced by the drive force switching process, calculate a motoring permission vehicle speed based on the first relationship, and in response to determining the braking torque being not reduced by the drive force switching process, calculate the motoring permission vehicle speed based on the second relationship.

2. The controller according to claim 1, wherein the processing circuitry is configured to prohibit execution of the motoring process in response to a discharge amount of the battery being greater than or equal to a predetermined determination value.

3. The controller according to claim 1, wherein the processing circuitry is configured to prohibit execution of the fuel cut-off process in response to an amount of the particulate matter deposited on the filter being greater than or equal to a predetermined threshold value.

4. The controller according to claim 1, wherein the processing circuitry is configured to execute the drive force switching process that reduces the braking torque generated by the engine, the first rotary electric machine, and the second rotary electric machine as a whole during deceleration of the hybrid electric vehicle in which the hybrid electric vehicle is traveling with an accelerator pedal released.

5. The controller according to claim 4, wherein the processing circuitry is configured to, in response to determining the hybrid electric vehicle traveling with the accelerator pedal released, determine whether the braking torque generated by the engine, the first rotary electric machine, and the second rotary electric machine as a whole during deceleration is reduced by the drive force switching process.

6. The controller according to claim 1, wherein the processing circuitry is configured to execute the motoring process in response to the vehicle speed of the hybrid electric vehicle being greater than or equal to the motoring permission vehicle speed.

7. The controller according to claim 6, wherein the processing circuitry is configured to, in response to the braking torque during deceleration of the hybrid electric vehicle being reduced in the drive force switching process, control the braking torque to remain reduced until a trip ends, the trip being a period from when an ignition switch is pressed to activate the controller to when the ignition switch is pressed to deactivate the controller.

8. The controller according to claim 7, wherein the processing circuitry is configured to, in the drive force switching process, when execution of the fuel cut-off process is prohibited, control the braking torque to remain reduced until the trip ends even when execution of the fuel cut-off process is permitted thereafter.

9. The controller according to claim 8, wherein the processing circuitry is configured to terminate the motoring process in response to the vehicle speed of the hybrid electric vehicle being less than the motoring permission vehicle speed.

10. The controller according to claim 8, wherein the processing circuitry is configured to terminate the motoring process in response to the hybrid electric vehicle being no longer decelerating.

11. The controller according to claim 8, wherein the processing circuitry is configured to terminate the motoring process in response to a temperature of the filter being greater than or equal to a predetermined temperature.

12. A method for controlling a hybrid electric vehicle, the hybrid electric vehicle including a drive system including an engine, a first rotary electric machine, and a second rotary electric machine, the engine including a filter configured to collect particulate matter from an exhaust gas, the first rotary electric machine being configured to generate rotational force applied to the engine in accordance with supply of electric power from a battery, and the second rotary electric machine being configured to receive rotational force transmitted from a wheel and generate electric power, the method comprising:

reducing a braking torque generated by the drive system during deceleration of the hybrid electric vehicle based on prohibition of execution of a fuel cut-off process;

maintaining a state in which the braking torque generated by the drive system during deceleration of the hybrid electric vehicle is reduced until the prohibition of execution of the fuel cut-off process is canceled or until a trip ends;

executing a motoring process that drives the engine using the first rotary electric machine in a state where combustion of the engine is stopped under a condition in which a deposition amount of the particulate matter is greater than or equal to a predetermined determination value, the hybrid electric vehicle is decelerating, and a vehicle speed of the hybrid electric vehicle is greater than or equal to a motoring permission vehicle speed; and terminating the motoring process when the vehicle speed of the hybrid electric vehicle is less than the motoring permission vehicle speed, wherein the reducing a braking torque generated by the drive system during deceleration of the hybrid electric vehicle based on prohibition of execution of a fuel cut-off process is executed together with increasing the motoring permission vehicle speed, and the method further comprises, when execution of the fuel cut-off process is prohibited, maintaining the state in which the braking torque generated by the drive system during deceleration of the hybrid electric vehicle is reduced until the trip ends even when execution of the fuel cut-off process is permitted thereafter.

13. The method according to claim 12, wherein the motoring permission vehicle speed is increased as a state of charge of the battery decreases.

\* \* \* \* \*